(12) United States Patent
Jost et al.

(10) Patent No.: US 10,250,105 B2
(45) Date of Patent: Apr. 2, 2019

(54) ELECTRIC MACHINE

(71) Applicant: Schaeffler Technologies AG & Co. KG, Herzogenaurach (DE)

(72) Inventors: Markus Jost, Buehl (DE); Dominik Hans, Muggensturm (DE)

(73) Assignee: SCHAEFFLER TECHNOLOGIES AG & CO., KF, Herzogenaurach (DE)

( * ) Notice: Subject to any disclaimer, the term of this patent is extended or adjusted under 35 U.S.C. 154(b) by 482 days.

(21) Appl. No.: 14/904,267

(22) PCT Filed: Jun. 18, 2014

(86) PCT No.: PCT/DE2014/200267
§ 371 (c)(1),
(2) Date: Jan. 11, 2016

(87) PCT Pub. No.: WO2015/003699
PCT Pub. Date: Jan. 15, 2015

(65) Prior Publication Data
US 2016/0156250 A1     Jun. 2, 2016

(30) Foreign Application Priority Data

Jul. 12, 2013  (DE) ........................ 10 2013 213 661

(51) Int. Cl.
| | |
|---|---|
| *H02K 9/02* | (2006.01) |
| *H02K 1/20* | (2006.01) |
| *H02K 5/18* | (2006.01) |
| *H02K 9/20* | (2006.01) |
| *H02K 3/28* | (2006.01) |
| *B60L 3/00* | (2019.01) |

(52) U.S. Cl.
CPC .............. *H02K 9/02* (2013.01); *B60L 3/0061* (2013.01); *H02K 1/20* (2013.01); *H02K 3/28* (2013.01); *H02K 5/18* (2013.01); *H02K 9/20* (2013.01); *B60L 2220/14* (2013.01); *B60L 2220/16* (2013.01); *B60L 2220/50* (2013.01); *Y02T 10/641* (2013.01)

(58) Field of Classification Search
CPC .. H02K 1/20; H02K 5/18; H02K 9/20; H02K 3/28; H02K 9/02
USPC ........................................... 310/64, 214, 215
See application file for complete search history.

(56) References Cited

U.S. PATENT DOCUMENTS 4,330,726 A * 5/1982 Albright ................... H02K 3/47
174/DIG. 20
5,866,959 A * 2/1999 Le Flem ................... H02K 1/20
310/187

(Continued)

FOREIGN PATENT DOCUMENTS

| CN | 101728904 A | 6/2010 |
|---|---|---|
| EP | 1432102 A2 | 6/2004 |

(Continued)

*Primary Examiner* — Naishadh N Desai
(74) *Attorney, Agent, or Firm* — LeKeisha M. Suggs

(57) ABSTRACT

An electric machine having a stator and a rotor, the rotor having a rotor body and magnets distributed around the outer radial circumference and the stator having a stator body and windings distributed around the inner radial circumference. The stator body has ribs protruding radially outward and heat pipes running from the radially inner windings. The heat pipes extend radially outward into the ribs.

14 Claims, 5 Drawing Sheets

(56) References Cited

U.S. PATENT DOCUMENTS

| | | | | |
|---|---|---|---|---|
| 5,866,966 A | * | 2/1999 | Fulton | H02K 3/522 310/214 |
| 2010/0033042 A1 | * | 2/2010 | Hassett | H02K 9/18 310/64 |
| 2010/0102650 A1 | * | 4/2010 | Eriksen | H02K 9/19 310/54 |
| 2011/0001320 A1 | * | 1/2011 | Lagerweij | H02K 1/148 290/55 |
| 2012/0256502 A1 | * | 10/2012 | Le Besnerais | H02K 9/02 310/54 |
| 2013/0009496 A1 | * | 1/2013 | Maki-Ontto | H02K 9/10 310/59 |
| 2013/0171923 A1 | * | 7/2013 | Li | H02K 1/32 454/284 |
| 2014/0239756 A1 | * | 8/2014 | Hodowanec | H02K 1/20 310/55 |
| 2014/0333163 A1 | * | 11/2014 | Horii | H02K 1/20 310/59 |

FOREIGN PATENT DOCUMENTS

| | | |
|---|---|---|
| EP | 2509196 A1 | 10/2012 |
| JP | 2000152563 A | 5/2000 |
| WO | 2009091248 A2 | 7/2009 |
| WO | 2014130999 A1 | 8/2014 |

* cited by examiner

ELECTRIC MACHINE

CROSS-REFERENCE TO RELATED APPLICATIONS

The present application is the U.S. national stage application pursuant to 35 U.S.C. § 371 of International Application No. PCT/DE2014/200267, filed Jun. 18, 2014, which application claims priority from German Patent Application No. DE 10 2013 213 661.7, filed Jul. 12, 2013, which applications are incorporated herein by reference in their entireties.

TECHNICAL FIELD

Disclosed herein is an electric machine having a rotor and a stator, in particular, for the drivetrain of motor vehicles.

BACKGROUND

Electric machines having a rotor and a stator according to the prior art serve to drive aggregate units or vehicles. In such cases, the stator is situated in an enclosing jacket, which also serves to hold and stabilize the stator. Dissipation heat develops, due in part to induced electric circular currents in the electrically conductive elements of the electric machine. This causes the rotor and stator of the electric machine to heat up, which results in a reduction of the performance of the electric machine. However, the aforementioned jacket has the disadvantage here that the dissipation of heat from the stator is impeded by the jacket.

Cooling systems for electric machines have therefore been developed, such as for example a liquid cooling system in which a liquid coolant flows through a cooling jacket and thereby cools the rotor and the stator. The delivery of liquid to the rotor normally takes place through the axle of the rotor, while the delivery of liquid to the stator normally takes place through a pipe or hose line fed in axially or radially. The liquid coolant is thereby conveyed through the stator and through the rotor, where it is warmed, and is then cooled down again outside the electric machine by means of a cooling radiator cooled, for example, by air. The liquid cooling system thus requires significant construction effort and expense, and not inconsiderable operating costs for the liquid cooling system.

Air cooling systems have also become known in which cooling ribs are provided on the outer jacket so as to enlarge the surface, enabling cooling air to be conveyed along the jacket in order to cool the jacket by the cooling air. The jacket represents a significant heat resistance in this case; however, such that the temperature of the electric machine still leaves something to be desired.

An electric machine has become known through EP 1 432 102 A2 in which so-called heat pipes are used to carry heat away from the gap between rotor and stator and to a cooling radiator. This configuration requires substantial construction space.

SUMMARY

Disclosed herein is an electric machine having a stator and a rotor, the rotor having a rotor body and magnets distributed around the outer radial circumference and the stator having a stator body and windings distributed around the inner radial circumference. The stator body has ribs protruding radially outward. Along with the cooling surface of the stator body, these ribs make an additional "flat" surface available which is effective for cooling.

In an exemplary embodiment, the stator has heat pipes emerging from the windings which are radially to the inside and which extend radially outward into the ribs. This enables air cooling, which is improved by the fact that heat pipes are used for the internal transporting of heat to the ribs.

Advantageously, in an exemplary embodiment, the windings extend in the axial direction of the stator, and at least individual heat pipes are at least partially surrounded by a winding. The result of this is that the heat can be removed directly from the windings.

In an exemplary embodiment, the stator body is made up of a plurality of plates, which are arranged in a stack when regarded in the axial direction of the stator, the plates having cutouts to accommodate the windings. This makes it possible to achieve a stator body that can be constructed simply and yet has good electrical properties with regard to avoiding current leakage.

Advantageously, in an exemplary embodiment, the plates have cutouts to receive a partial section of the heat pipes. This enables a heat pipe to be accommodated partly by a winding and partly by a heat pipe, achieving an improved removal of heat directly from the winding.

Advantageously, in an exemplary embodiment, the plates are made from different types of sheet metal. For example, the plates are made from at least two different types of sheet metal, where the larger plates, i.e., the plates having a greater diameter, form the ribs. In an exemplary, the plates are made from at least two different materials, so that plates of a more heat-conductive material may be provided between the plates of a less heat-conductive material. For example, only a small part, i.e., only every third or only every 10th plate is made of a more heat-conductive material. In this case, in an exemplary embodiment, the plates having the better heat conductivity are all spaced at essentially the same intervals. For example, material for the more heat-conductive plates may also be used here which has a lower magnetic conductivity, i.e., which worsens the magnetic flux and therefore reduces the efficiency of the electric machine.

In an exemplary embodiment, in the outer areas, i.e., outside of the stator surface formed by the rib-free area, the ribs also have a form or configuration that further enlarges the surface of the ribs. This means, for example, that the ribs are modified in at least one of the following ways: with jagged edges, with notching, provided with holes, incised and pulled apart like expanded metal, or generally made non-round. These methods enlarge the surface and/or enable an improved flow through the ribs, any of which beneficially supports convection.

In an exemplary embodiment, the ribs have additional functional features, which serve to facilitate assembly, for example, involving assembly or orientation features. In an exemplary embodiment, the ribs are attaching holes or hooks or empty spaces, or a plurality of various ones of these features together. Each of these additional features increases the usefulness of the ribs as such. The functionality of the ribs is also increased by the described heat pipes, in that they set up a thermal cooling path to the ribs which begins already in the interior of the winding, instead of only at the surface of the copper winding.

In an exemplary embodiment, the stator body is made up of plates that have cutouts for the heat pipes and those that do not have cutouts for the heat pipes. This makes it possible to achieve the spaced arrangement of heat pipes in a modular design.

Advantageously, in an exemplary embodiment, the ribs run in the axial direction, and are formed of plates which receive the heat pipes in the area of the ribs.

The axial direction is defined in reference to the rotor and the stator, the axis in terms of the axial direction being the axis of rotation of the rotor.

Advantageously, in an exemplary embodiment, the ribs run in the circumferential direction, and are formed of plates which also receive the heat pipes in the area of the ribs. Depending on the configuration of the electric machine and of the air flow, this can make it possible to achieve good cooling.

Advantageously, in an exemplary embodiment, the plates have the cutouts for the windings distributed at their inner circumference, extending radially outward. This enables easy installation from radially inside, and the gap between the windings and the magnets of the rotor can be reduced.

Advantageously, in an exemplary embodiment, the plates have cutouts for the heat pipes which extend radially outward starting from the cutouts for the windings. The result of this is that starting from the windings the heat pipes can be routed radially outward to the ribs, so as to achieve good air cooling.

Advantageously, in an example embodiment, the plates have projections extending radially outward which form the ribs.

BRIEF DESCRIPTION OF THE DRAWINGS

Various embodiments are disclosed, by way of example only, with reference to the accompanying schematic drawings in which corresponding reference characters indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the electric machine disclosed herein.

Figure 1:
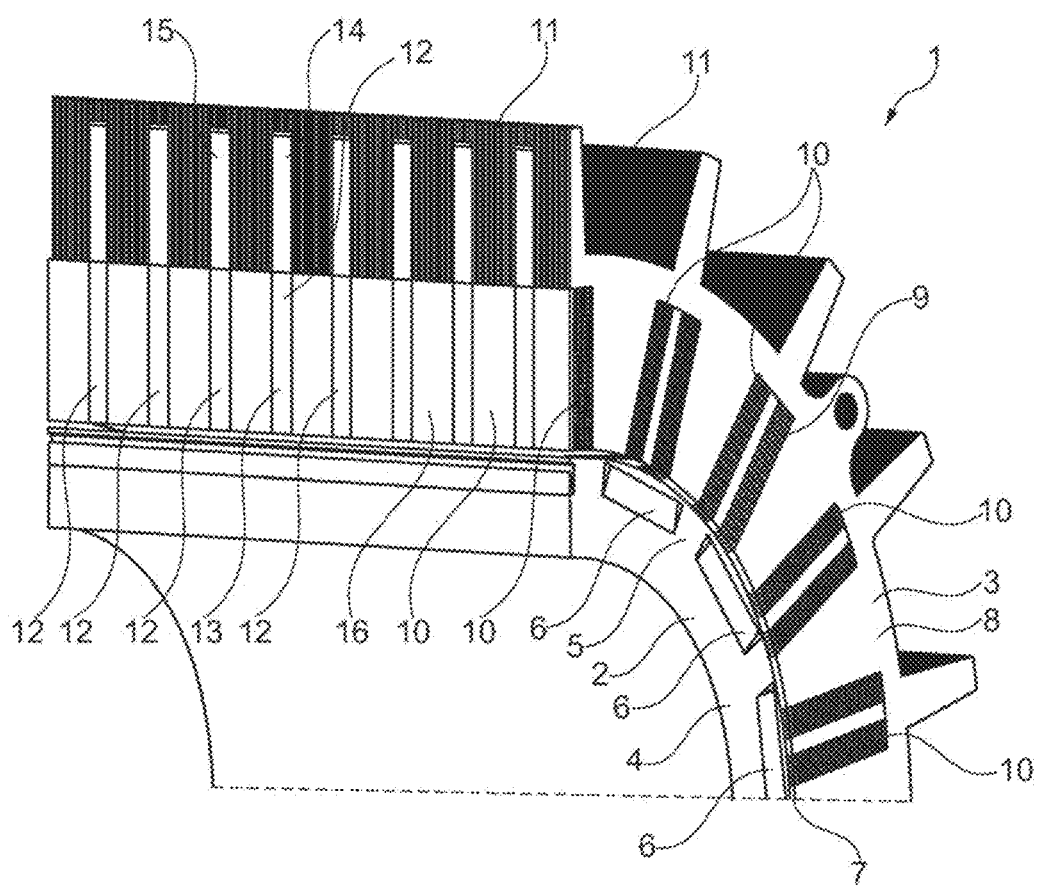
FIG. 1 is a perspective cross-sectional view of an exemplary embodiment of an electric machine with ribs.

FIG. 1 is a perspective cross-sectional view of an exemplary embodiment of electric machine 1 with ribs. Machine 1 includes rotor 2 and stator 3. Stator 3 is positioned radially outside of rotor 2, with rotor 2 being able to rotate radially inside stator 3.

Rotor 2 includes rotor body 4, which has magnets 6 on radially outer circumference 5, which are distributed around circumference 5. Gap 7 is provided between rotor 2 and stator 3, so that rotor 2 is able to rotate freely radially inside stator 3.

Stator 3 includes stator body 8, which extends in a ring shape around rotor 2. Stator body 8 has receptacles 9 to receive windings 10. Windings 10 extend in the axial direction of stator body 8, there being a plurality of windings 10 distributed around stator body 8. In an exemplary embodiment, windings 10 extend in the axial direction. Radially on the outside, stator body 8 has ribs 11 projecting radially outward, and extending in the axial direction.

Starting from winding 10, heat pipes 12 are provided, which extend outward in the radial direction, and which along part of extension 13 are situated in winding 10 and along another part of their extension 14 extend inside stator body 8 in the area of ribs 11. To this end, recesses and cutouts 15 are provided within winding 10 and stator body 8 or rib 11, which receive heat pipes 13.

In an exemplary embodiment, heat pipes 13 in the radially internal region can also be joined in the area of winding 10 by means of connecting element 16, so that connecting element 16, which is connected to a plurality of heat pipes, is located in winding 10.

Ribs 11, which extend in the axial direction, are distributed protruding radially outward beyond the circumference of stator body 8. In an exemplary embodiment, ribs 11 have an essentially trapezoidal cross-sectional area. According to other exemplary embodiments, the cross-sectional area of rib 11 are, essentially rectangular or triangular or the like.

Figure 2:
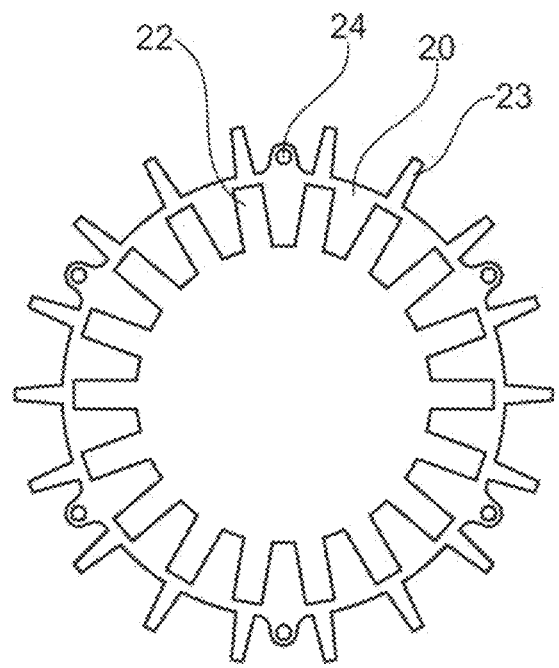
FIG. 2 is a front view of an exemplary embodiment of a plate for the stator body shown in FIG. 1.

FIG. 2 is a front view of an exemplary embodiment of a plate for the stator body shown in FIG. 1.

Figure 3:
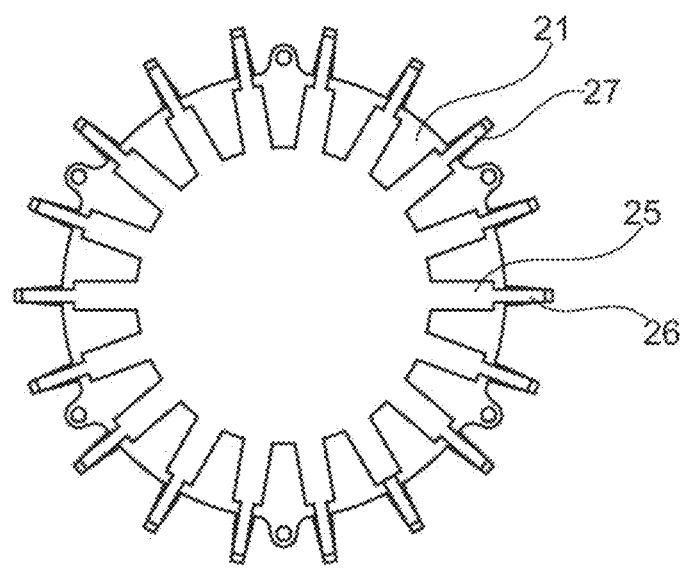
FIG. 3 is a front view of an exemplary embodiment of a plate for the stator body shown in FIG. 1.

FIG. 3 is a front view of an exemplary embodiment of a plate for the stator body shown in FIG. 1. FIG. 2 and FIG. 3 show plates 20, 21 respectively, which form stator body 8 according to FIG. 1 through a side-by-side arrangement in the axial direction. Plate 20 is ring-shaped, and has cutouts 22 on its radially inner circumference, which serve to receive windings 10. Advantageously, in an exemplary embodiment, cutouts 22 are rectangular, but other shapes of cutout are also possible. Advantageously, cutouts 22 are open radially toward the inside.

On its radially outer circumference, plate 20 has projections 23 which form ribs 11. The projections are distributed around the circumference. Fastening holes 24 are provided for attachment and assembly.

In the arrangement according to FIG. 1, plate 20 is inserted between heat pipes 12, in order to form a corresponding part of stator body 8 between heat pipes 12.

Plate 21, according to FIG. 3, has cutouts 25 on its radially inner circumference, which serve to receive windings 10. Starting from cutouts 25, cutouts 26 extending radially outward are provided cutouts 26 receive heat pipes 12. On the radially outer circumference, plate 21 has projections 27 which form ribs 11. Cutouts 26 advance clear into projections 27, so that heat pipes 12 located in cutout 26 extend clear into ribs 11.

In the arrangement according to FIG. 1, plate 21 is used in the area of heat pipes 12, in order to form the corresponding part of stator body 8.

Figure 4:
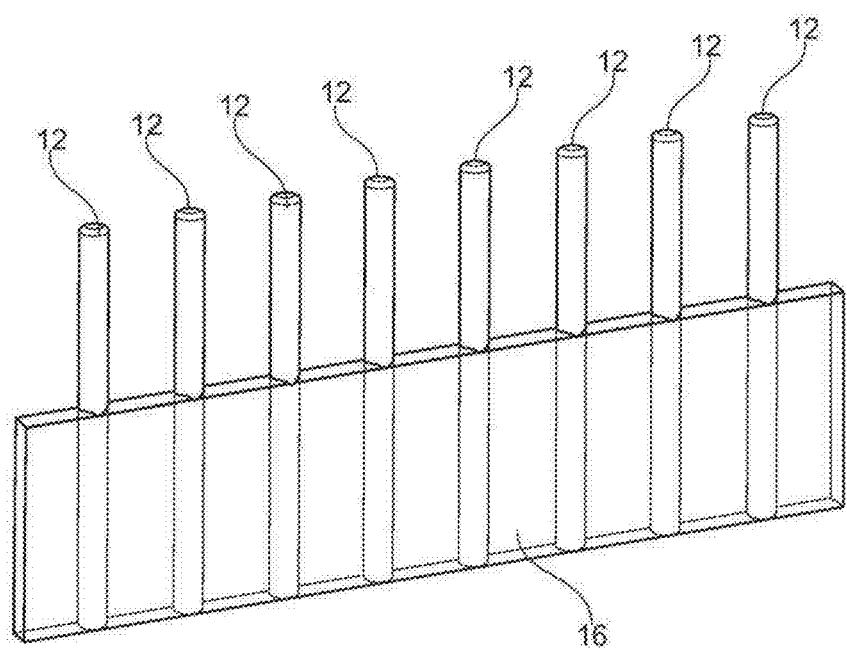
FIG. 4 is a perspective view of an example configuration of the connecting element shown in FIG. 1 with heating pipes.

FIG. 4 is a perspective view of an example configuration of the connecting element shown in FIG. 1 with heating pipes. FIG. 4 shows a configuration of connecting element 16 having an arrangement of heat pipe 12 elements. In this case, heat pipes 12 are embedded in connecting element 16 for part of their radial extension, and for another part of their radial extension, protrude beyond connecting element 16. Connecting element 16 also serves as a collector for good thermal coupling of heat pipe 12 elements to corresponding winding 10. The collector is designed with good thermal conductivity and at the same time with good electrical insulation, while the collector has high mechanical stability under thermal inflow. The materials of connecting element 16 are preferably made of ceramic or polymer.

Heat pipes 12, which are tube-shaped, are embedded in connecting element 16 designed as a collector, are preferably received or injected into bore holes; heat pipes 12 have an internal circuit of evaporating and re-condensing coolant.

Figure 5:
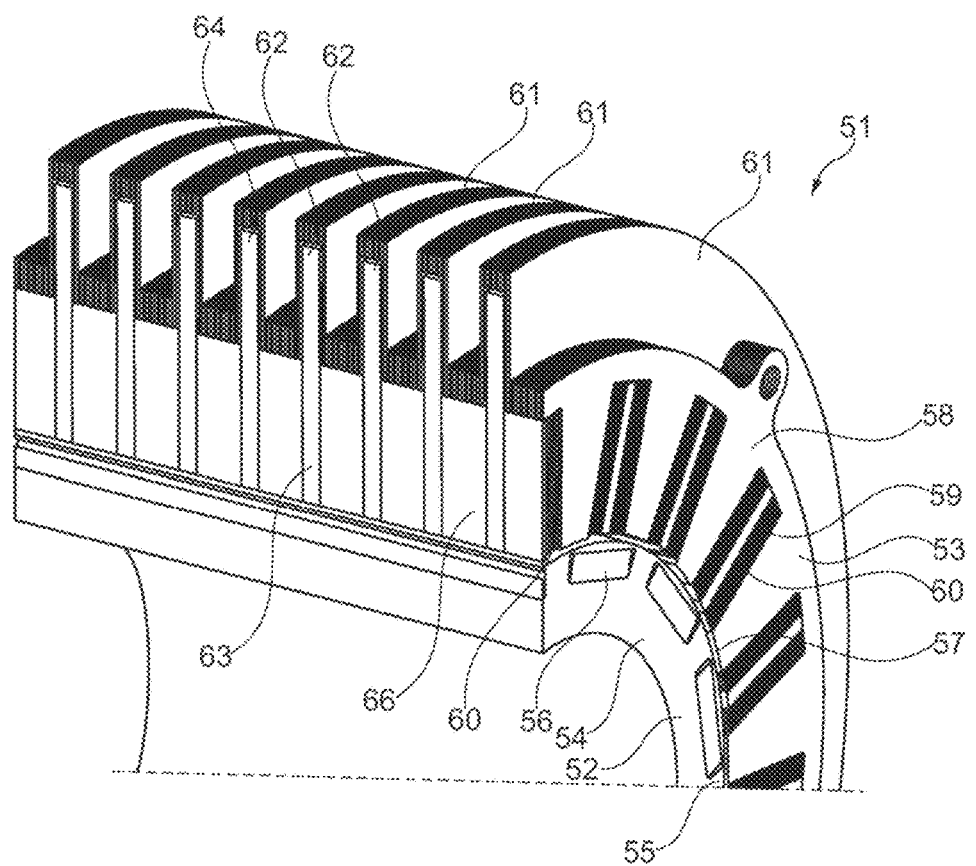
FIG. 5 is a perspective cross-sectional view of an exemplary embodiment of an electric machine with ribs.

FIG. 5 is a perspective cross-sectional view of an exemplary embodiment of electric machine 51 with ribs. Electric machine 51 includes rotor 52 and stator 53. Rotor 52 includes rotor body 54, with magnets 56 distributed around circumference 55. Rotor 52 is again able to turn radially within stator 53, with stator body 58 extending in a ring shape around rotor 52 and gap 57 being provided between rotor 52 and stator 53.

Stator body 58 has receptacles 59 to receive windings 60 of the stator; receptacles 59 are arranged openly in the radially inner edge zone of stator body 58. In the radially outer edge zone of stator body 58, ribs 61 are provided which extend in the circumferential direction, with individual ribs 61 being spaced apart from each other. Situated in windings 60 and in ribs 61 are heat pipes 62, which are positioned within windings 60 for a part of their extension 63 and within ribs 61 for another part of their extension 64. In an exemplary embodiment, heat pipes 62 have their radially inner edge zone embedded in connecting element 66.

Figure 6:
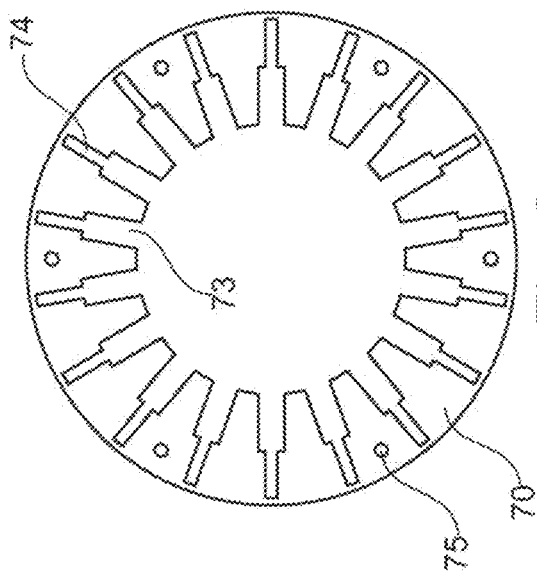
FIG. 6 is a front view of an exemplary embodiment of a plate for the stator body shown in FIG. 5.

FIG. 6 is a front view of an exemplary embodiment of a plate for the stator body shown in FIG. 5.

Figure 7:
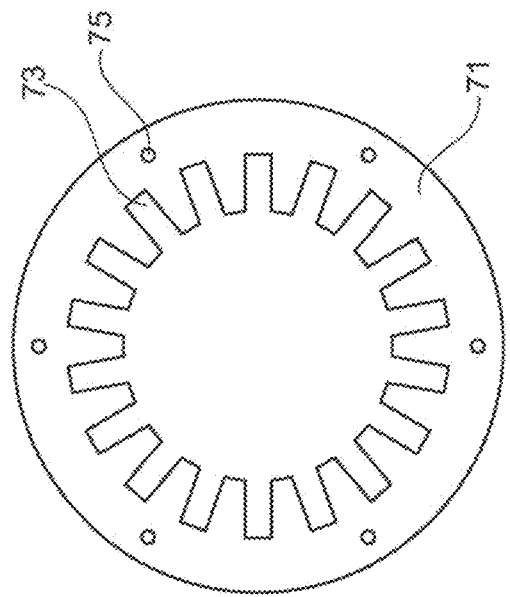
FIG. 7 is a front view of an exemplary embodiment of a plate for the stator body shown in FIG. 5; and, FIG. 8 is a front view of an exemplary embodiment of a plate for the stator body shown in FIG. 5.

FIG. 7 is a front view of an exemplary embodiment of a plate for the stator body shown in FIG. 5.

Figure 8:
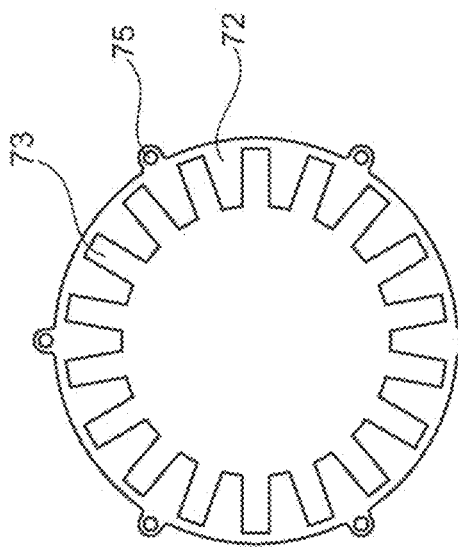

FIG. 8 is a front view of an exemplary embodiment of a plate for the stator body shown in FIG. 5. FIGS. 6 through 8 show plates 70 through 72, which are used to form stator body 58.

Plate 70 serves to receive windings 60 and heat pipes 62. Plate 70 has, on its radially inner circumference, cutouts 73 to receive windings 60. Radially outside of cutouts 73, adjoining cutouts 74 are provided to receive heat pipes 62. Bore holes 75 are provided to connect the plates 70.

Plate 71 has only cutout 73 to receive windings 60, cutout 73 extending radially outward from the radially inner edge zone. Bore holes 75 for attaching are also provided.

The radial height or extension of plate 71 corresponds to the radial height of plate 70, so that ribs 61 are formed by plates 70 and 71, plate 70 being the plate which receives a heat pipe element and plate 71 being an adjacent element to cover heat pipe elements 72 laterally.

Plate 72 is similar in design to plate 71, having cutouts 73 situated radially on the inside, with plate 72 having a lesser radial extension than plates 70 and 71, so that plate 72 is used in the exemplary embodiment of FIG. 5 to space ribs 61 apart from each other. Plates 72 form stator body 58 in the region between ribs 61.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS 1 electric machine
2 rotor
3 stator
4 rotor body
5 circumference
6 magnet
7 gap
8 stator body
9 receptacle
10 windings
11 ribs
12 heat pipes
13 part of extension
14 part of extension
15 cutout
16 connecting element
20 plate
21 plate
22 cutout
23 projection
24 fastening hole
25 cutout
26 cutout
27 projections
51 electric machine
52 rotor
53 stator
54 rotor body
55 circumference
56 magnet
57 gap
58 stator body
59 receptacle
60 windings
61 ribs
62 heat pipes
63 part of extension
64 part of extension
66 connecting element
70 plate
71 plate
72 plate
73 cutout
74 cutout
75 bore hole

What is claimed is:

1. An electric machine, comprising:
   a stator comprising:
      a stator body formed of adjacent plates and having an inner circumference; and,
      a plurality of ribs formed by the adjacent plates and protruding radially outward from said stator body;

a plurality of windings arranged on said inner circumference of said stator body;

a rotor concentrically arranged within said stator, said rotor comprising a rotor body having an outer circumference; and, a plurality of magnets arranged on said outer circumference of said rotor body;

wherein said stator includes a plurality of heat pipes that extend radially outward through said plurality of windings and into said plurality of ribs.

2. The electric machine recited in claim 1; wherein:
said plurality of windings extends in an axial direction of said stator; and;
said plurality of heat pipes is at least partially surrounded by said plurality of windings.

3. The electric machine recited in claim 1; wherein:
the adjacent plates are a plurality of plates arranged in an axial direction of said stator; and,
said plurality of plates comprise a plurality of cutouts arranged to receive said plurality of windings and at least a partial section of said plurality of heat pipes.

4. The electric machine recited in claim 3; wherein:
the plurality of plates includes first plate and second plates;
said first and second plates are made of different types of sheet metal;
said first plate has a larger radius that said second plate; and,
said first plate forms said plurality of ribs.

5. The electric machine recited in claim 3; wherein fewer than half of all plates in the plurality of plates are made of a material that has better thermal conductivity than a material from which the rest of said plurality of plates is made.

6. The electric machine recited in claim 3; wherein at most every third plate in the plurality of plates in the axial direction is made of a material that has better thermal conductivity than a material from which the rest of said plurality of plates is made.

7. The electric machine recited in claim 3; wherein every tenth plate in the plurality of plates in the axial direction is made of a material that has better thermal conductivity than a material from which the rest of said plurality of plates is made.

8. The electric machine recited in claim 3; wherein:
the plurality of plates comprises a first plate and a second plate; and;
said first plate comprises cutouts for said heat pipes.

9. The electric machine recited in claim 1; wherein:
said plurality of ribs is axially and circumferentially arranged and is formed of a plurality of plates; and,
the plurality of plates receives said plurality of heat pipes within said plurality of ribs.

10. The electric machine recited in claim 9; wherein said plurality of plates further comprises a plurality of cutouts extending radially outward from said windings distributed around said inner circumference of said stator.

11. The electric machine recited in claim 9; wherein:
said plurality of plates comprises a plurality of cutouts; and,
the plurality of heat pipes extends radially outward from said plurality of cutouts.

12. The electric machine recited in claim 9; wherein said plurality of plates further comprises a plurality of projections extending radially outward and forming said ribs.

13. An electric machine, comprising:
a stator comprising:
a stator body having an inner circumference; and,
a plurality of ribs extending radially outward from said stator body and extending in an axial direction of the stator body;
a plurality of windings arranged on said inner circumference of said stator body;
a rotor concentrically arranged within said stator; said rotor comprising a rotor body having an outer circumference; and,
a plurality of magnets arranged on said outer circumference of said rotor body, wherein said stator comprises a plurality of heat pipes that extend radially outward through said plurality of windings and into said plurality of ribs.

14. An electric machine, comprising:
a stator comprising:
a stator body having an inner circumference; and,
a plurality of ribs protruding radially outward from said stator body, the plurality of ribs being spaced apart in an axial direction of the stator body and each rib extending in a circumferential direction around the stator body;
a plurality of windings arranged on said inner circumference of said stator body;
a rotor concentrically arranged within said stator; said rotor comprising a rotor body having an outer circumference; and,
a plurality of magnets arranged on said outer circumference of said rotor body;
wherein said stator comprises a plurality of heat pipes that extend radially outward through said plurality of windings and into said plurality of ribs.

* * * * *